May 4, 1937.   J. E. TORBERT, JR   2,079,053
NOVELTY
Filed May 16, 1936   2 Sheets-Sheet 1
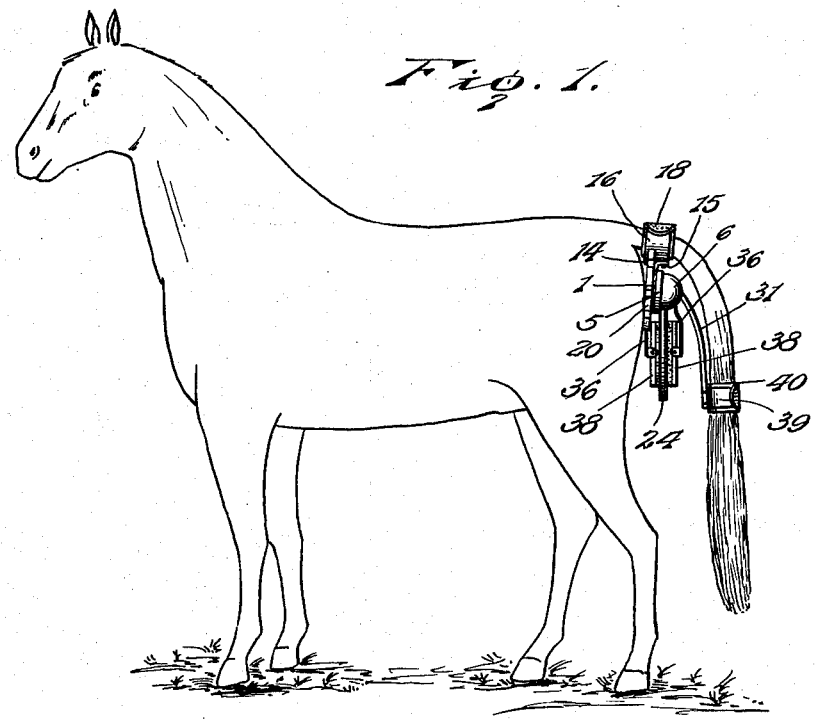
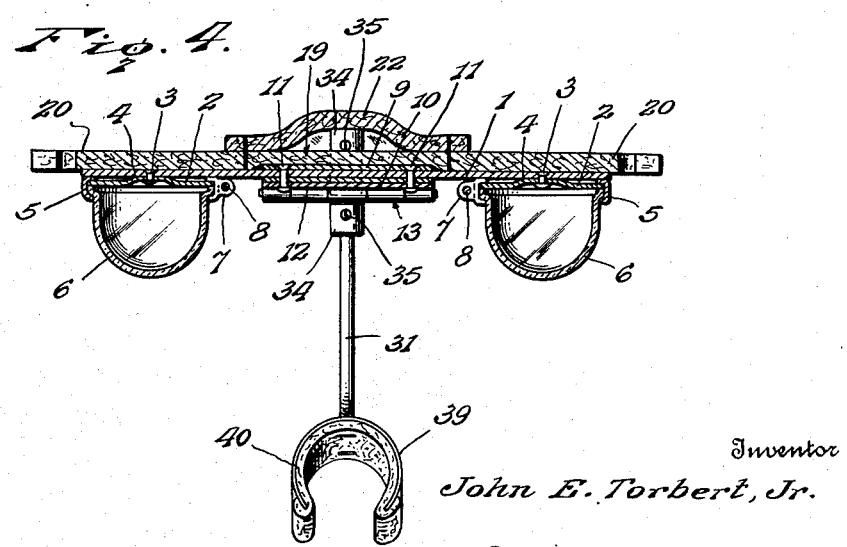
Inventor
John E. Torbert, Jr.
By Lacey & Lacey, Attorneys May 4, 1937. J. E. TORBERT, JR 2,079,053
NOVELTY
Filed May 16, 1936 2 Sheets-Sheet 2
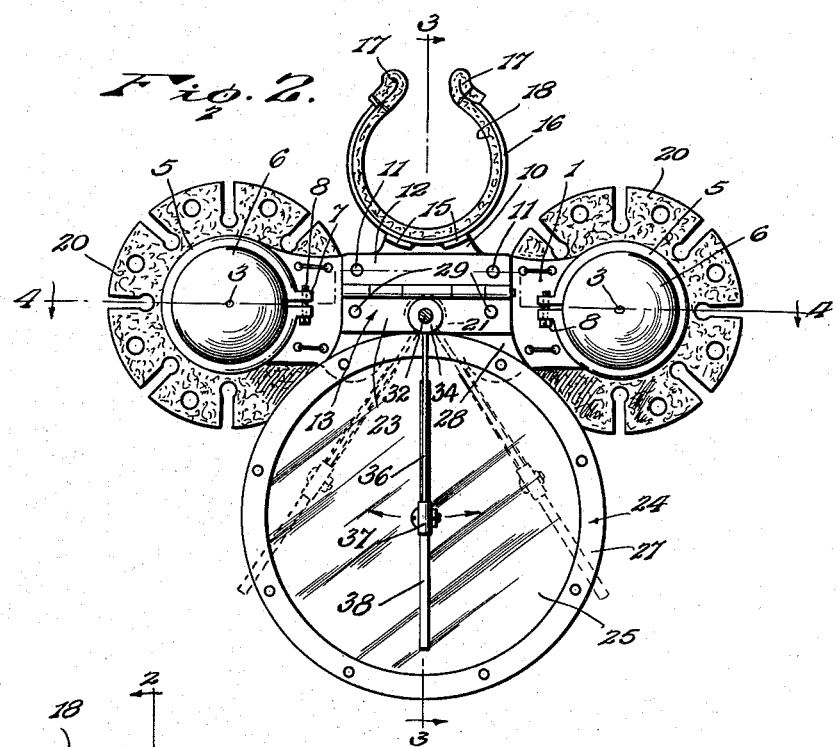
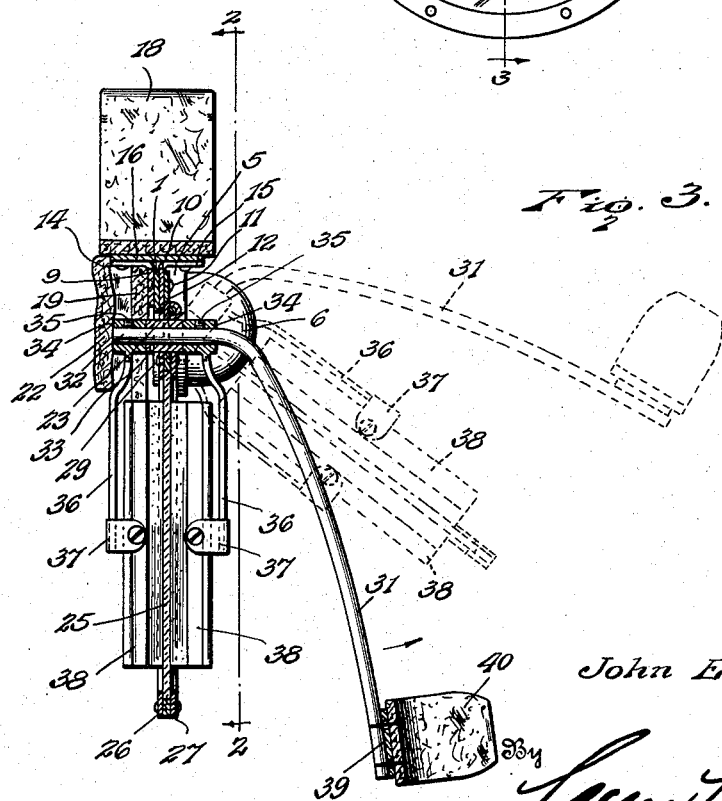
Inventor
John E. Torbert, Jr.
By Lacey & Lacey,
Attorneys Patented May 4, 1937

2,079,053

UNITED STATES PATENT OFFICE 2,079,053

NOVELTY

John E. Torbert, Jr., National City, Calif.

Application May 16, 1936, Serial No. 80,195

9 Claims. (Cl. 54—1)

This invention relates to a novelty adapted to be applied to a horse or other animal and serves not only as a novelty to attract attention and afford amusement to observers, but also as a shield and as a safety device to prevent a horse from being struck and injured by automobiles moving along a road and approaching the horse from the rear.

One object of the invention is to provide a device of this character adapted to be supported and held in place by engagement with the tail of the animal and carrying safety reflectors disposed at opposite sides of the animal's tail so that when a person is riding a horse along a road at night and an automobile approaches the horse from the rear, the signals will be illuminated by reflecting light from the headlights of the automobile and thus permit the driver of the automobile to see that there is a horse ahead of him and eliminate danger of the automobile striking and injuring the horse.

Another object of the invention is to provide the attachment with a shield disposed at the back of the horse under the tail where it will serve as a wind deflector.

Another object of the invention is to so mount the shield that it may have movement towards and away from the horse as the horse raises or lowers its tail and to also provide a wiper mounted for oscillating movement across the shield and having an actuating member adapted to be connected with the horse's tail so that as the horse moves its tail to push off flies, the wiper will be moved back and forth across the windshield and the glass forming part of the shield kept clean.

The invention is illustrated in the accompanying drawings, wherein

Figure 1 is a view in side elevation showing the device applied to a horse, the size of the attachment relative to the horse being somewhat exaggerated for sake of clearness.

Figure 2 is a view in elevation looking at the device from the rear with the actuating arm or lever in section, the view being taken along the line 2—2 of Figure 3.

Figure 3 is a sectional view taken along the line 3—3 of Figure 2.

Figure 4 is a horizontal sectional view taken along the line 4—4 of Figure 2.

This attachment, which may be referred to as a novelty or as a combined windshield and safety device for a horse or other animal, is to be applied to the horse, as shown in Figure 1, and when in place will attract the attention of persons attending a horse show or the like and afford a great deal of amusement. The device is also of practical value as it serves very effectively as a shield also as a safety device to prevent accidents due to the driver of the automobile failing to see a horse ahead of him when driving during dark nights. While the device has been shown applied to a horse, it will be apparent that, by making it of the proper size, it may be applied to dogs and other animals.

The mounting plate or bridge 1 of this device is formed of stiff metal and is of sufficient length to project from opposite sides of a horse's tail. Circular plates 2 are secured against the outer face of the mounting plate or bridge 1 by rivets 3 passed through the depressed central portions 4 of the plates 2 and, upon referring to Figure 4, it will be seen that marginal portions of the plates 2 are spaced from the mounting plate in order that the inner flanges of securing rings 5 may be engaged between the plate 1 and marginal portions of the plates 2. These rings serve to secure domes 6 formed of transparent material. Each of the rings 5 is a split ring having lugs 7 at its ends through which a screw 8 passes and it will be readily seen by inspecting Figure 2 that when the screws are tightened, the bands will be contracted about the plates 2 and marginal portions of the domes 6. One of the domes is colored red and the other green or blue, thereby conforming to the colors of port and starboard lights and they will display these colors when illuminated by light from the headlights of an automobile approaching a horse from the rear. Plates 9 and 10 are secured against inner and outer faces of the bridge or plate 1 by rivets 11 which also serve to secure the leaf 12 of a hinge 13 against the plate 10 and, upon referring to Figures 2 and 3, it will be seen that the plates 9 and 10 are formed with arms 14 and 15 which project in opposite directions from the upper edge of the plate 1 and are secured to a substantially U-shaped clamping band 16. This band is formed of resilient metal and has its arms converging toward their free ends where they diverge to provide lips 17. A strip of padding 18 is provided as a liner for the clamp 16 and has its end portions carried outwardly over the lips 17 and secured, as shown in Figure 2. Therefore, the clamp will be provided with a soft liner and can engage about and firmly grip the horse's tail, as shown in Figure 1, and firmly hold the device in its proper position with the intermediate portion of the plate 1 extending under the horse's tail and the light reflecting signals at opposite sides of the horse's tail where they can be easily seen when illuminated by light from the headlight of an automobile. A pad 19 formed of thick felt and having enlarged circular end portions 20 joined by a reduced neck is secured against the inner or front face of the mounting plate 1 and, upon referring to Figure 2, it will be seen that the end portions 20 are of appreciably greater diameter than the domes 6. Therefore, these circular end portions of the pad 19 project from margins of the mounting plate and provide ornamental borders for the signals, as well as serving very effectively to prevent chafing. The lower edge of the intermediate portion of the pad or sheet of felt 19 is cut to follow marginal edges of the recess 21 formed in the intermediate portion of the mounting plate 1 and in order to bridge this recess, there has been provided an auxiliary pad 22 formed of felt and stitched or otherwise secured to the pad 19.

The lower leaf 23 of the hinge 13 carries a windshield 24 consisting of a glass 25 secured between inner and outer bordering plates or rings 26 and 27, the inner ring 26 having an upwardly extending tongue 28 upon which the hinge leaf is secured by the rivets 29. An arm or lever 31, formed from a length of metal rod which may be brass or any other stiff metal, has its upper end portion bent to form a rocker shaft 32 which is rotatably engaged through a bearing sleeve 33. This bearing sleeve is rigidly mounted through the tongue 28 at the lower hinge leaf 23 and by referring to Figure 3 it will be seen that the rocker shaft or shank 32 projects from ends of the bearing sleeve and carries collars 34 which are securely held in fixed position by set screws 35. Arms 36 extend downwardly from the collars and at their lower ends carry U-shaped clips 37 which project towards the glass and carry wipers 38. The wipers are of a conventional construction and have operative engagement with opposed faces of the glass so that when the wipers are moved across the glass, the glass will be thoroughly cleaned. At its lower end, the actuating arm or lever 31 carries a resilient U-shaped clamp 39 lined with felt, as shown at 40, and of the proper dimensions to engage about a horse's tail, as shown in Figure 1. It will thus be seen that when the horse swishes its tail in order to remove flies, the arm or lever will be swung transversely of the windshield and the shank or rock shaft turned in the bearing. During this movement the wipers will be swung back and forth across the glass and the glass thoroughly cleaned. As the windshield is secured to the lower leaf of the hinge, it may have movement towards and away from the horse when the animal raises or lowers its tail and, therefore, movements of the animal's tail will not be interfered with and the animal will not be subjected to discomfort when the device is in place. The inner collar moves through the recess in the lower portion of the mounting plate 1 during movement of the windshield towards the horse but it will be prevented from having direct contact with the horse as it engages the felt strip 22, as clearly shown in Figure 4.

Having thus described the invention, what is claimed as new is:

1. A windshield, means for mounting the windshield at the rear of a horse, and a wiper for the windshield having operating means adapted to be actuated by movement of a portion of the horse.

2. A windshield, means for mounting the windshield at the rear of a horse under the horse's tail, and a wiper for the windshield having operating means adapted to be actuated by movements of the horse's tail.

3. A windshield, mounting means for the windshield including a member engageable with a horse's tail to suspend the mounting and the windshield under the horse's tail, and a wiper for said windshield having operating means including a member adapted to engage the horse's tail and cause actuation of the operating means when the horse's tail is in motion.

4. A windshield, a mounting for said windshield including a member adapted to grip a horse's tail and suspend the mounting and the windshield at the back of the horse with the windshield under the horse's tail, a wiper for said windshield, an operating lever for the wiper movable transversely of the windshield, and a member carried by said lever for gripping a horse's tail and causing the lever to move with the horse's tail to operate the wiper.

5. A windshield, a mounting for said windshield including a member adapted to grip a horse's tail and suspend the mounting and the windshield at the back of the horse with the windshield under the horse's tail, a wiper for said windshield, an operating lever disposed vertically and having its upper portion provided with a shank journalled through the windshield, said wiper being fixed to the shank and having movement across the windshield when the shank is turned by swinging movements of the lever, and means carried by said lever for gripping a horse's tail to cause movement of the lever with the horse's tail.

6. In a device of the character described, a mounting plate of a length to extend under a horse's tail and project from opposite sides thereof, a clamp extending upwardly from the plate midway the length thereof for gripping a horse's tail and suspending the plate, a hinge having upper and lower leaves, the upper leaf being secured to the plate under said clamp, a windshield under the mounting plate secured at its upper end to the lower leaf of said hinge for swinging movement towards and away from a horse, a bearing sleeve extending through the upper portion of the windshield under the hinge, a lever extending vertically and having its upper portion bent to form a shank journalled through said sleeve and projecting from ends of the sleeve, wipers for front and rear faces of the windshield having rods provided with collars at their upper ends secured about projecting portions of the shank whereby the wipers sweep across the windshield when the shank is rotated, and a clamp at the lower end of said lever for gripping the lower portion of a horse's tail and causing the lever to swing transversely of the windshield to turn the shank when the horse's tail is moved transversely, said lever also causing the windshield to be moved forwardly and rearwardly by the horse's tail.

7. In a device of the character described, a mounting plate, a hinge midway the length of said plate, a clamp extending upwardly from the plate over said hinge for gripping a horse's tail and suspending the plate under the horse's tail with end portions of the plate projecting from opposite sides of the horse's tail, a windshield under said plate secured at its upper end to said hinge for swinging movement forwardly and rearwardly, a wiper for said windshield and an actuating lever for the wiper carried by said hinge and having a clamp for gripping a horse's tail whereby the wiper and the windshield will be moved by movements of a horse's tail.

8. In a device of the character described, a mounting plate, a hinge midway the length of said plate having an upper leaf secured to the plate, a clamp extending upwardly from the plate over said hinge for gripping a horse's tail and suspending the plate under the horse's tail with end portions of the plate projecting from opposite sides of the horse's tail, a sheet of padding secured against the inner face of said plate and having enlarged end portions for covering inner faces of end portions of the plate, a windshield under the plate between the enlarged end portions of said padding secured at its upper end to the lower leaf of said hinge, a wiper for the windshield, and operating means for said wiper pivoted to the lower leaf of the hinge adapted to be connected with and actuated by movements of the horse's tail.

9. In a device of the character described, a mounting plate of a length to extend under a horse's tail with end portions projecting from opposite sides thereof, suspending means for said plate, a sheet of padding secured against the inner face of said plate, intermediate portions of the plate and padding being formed with alined recesses forming a passage leading from their lower edges, an auxiliary sheet of padding carried by the first mentioned padding and bridging said passage, a windshield hinged to said plate above the recess and depending from the plate with its upper portion covering the recess, a lever having a shank at its upper end journalled through said windshield, front and rear collars carried by said shank, wipers having arms carried by and depending from said collars, the front collar and arm being movable through the passage into and out of engagement with the auxiliary padding, and means for connecting said lever with a horse's tail.

JOHN E. TORBERT, Jr.